(12) United States Patent
Dennis

(10) Patent No.: US 10,882,564 B2
(45) Date of Patent: Jan. 5, 2021

(54) WHEEL HOUSING LINER ASSEMBLY

(71) Applicant: Nissan North America, Inc., Franklin, TN (US)

(72) Inventor: Thomas Scott Dennis, Phoenix, AZ (US)

(73) Assignee: Nissan North America, Inc., Franklin, TN (US)

( * ) Notice: Subject to any disclaimer, the term of this patent is extended or adjusted under 35 U.S.C. 154(b) by 77 days.

(21) Appl. No.: 16/287,076

(22) Filed: Feb. 27, 2019

(65) Prior Publication Data

US 2020/0269932 A1    Aug. 27, 2020

(51) Int. Cl.
*B62D 25/16*    (2006.01)

(52) U.S. Cl.
CPC .................... *B62D 25/163* (2013.01)

(58) Field of Classification Search
CPC ...................................................... B62D 25/163
See application file for complete search history.

(56) References Cited

U.S. PATENT DOCUMENTS

| 1,704,048 | A | * | 3/1929 | Jordan | B62D 25/18 |
| | | | | | 280/847 |
| 4,735,427 | A | * | 4/1988 | Fuchs | B60R 13/0861 |
| | | | | | 280/847 |
| 5,462,331 | A | * | 10/1995 | Stief | B60R 13/0861 |
| | | | | | 280/847 |
| 6,086,104 | A | * | 7/2000 | Marchisio | B62D 25/161 |
| | | | | | 280/851 |
| 6,155,624 | A | * | 12/2000 | Bienenstein, Jr. | B62D 25/161 |
| | | | | | 280/847 |
| 6,276,746 | B1 | * | 8/2001 | Gentry | B62D 37/02 |
| | | | | | 280/159 |
| 7,909,392 | B2 | * | 3/2011 | Takeuchi | B62D 25/161 |
| | | | | | 296/198 |
| D674,732 | S | * | 1/2013 | Gladwin | D12/184 |
| 8,523,270 | B2 | * | 9/2013 | Marlier | B62D 35/008 |
| | | | | | 296/180.1 |
| 8,844,971 | B2 | * | 9/2014 | Tanaka | B62D 25/182 |
| | | | | | 280/851 |
| 8,973,981 | B2 | * | 3/2015 | Vaughn, Jr. | B60R 13/0861 |
| | | | | | 296/198 |
| 9,428,121 | B2 | * | 8/2016 | Vaughn, Jr. | B29C 69/00 |
| 10,131,383 | B2 | * | 11/2018 | Job | B62D 25/18 |
| 2006/0214474 | A1 | * | 9/2006 | Omiya | B60R 13/0861 |
| | | | | | 296/198 |
| 2008/0231082 | A1 | * | 9/2008 | Mathew | B62D 25/161 |
| | | | | | 296/198 |
| 2010/0078927 | A1 | * | 4/2010 | Takeuchi | D04H 1/48 |
| | | | | | 280/851 |

FOREIGN PATENT DOCUMENTS

JP    3952987 B2    8/2007

* cited by examiner

*Primary Examiner* — Lori L Lyjak
(74) *Attorney, Agent, or Firm* — Global IP Counselors, LLP

(57) ABSTRACT

A wheel housing liner assembly that includes a liner supporting bracket. The liner supporting bracket has a first portion, a second portion and a main portion that extends from the first portion to the second portion. The first portion is configured to attach to an inboard panel of a vehicle wheel housing structure. The second portion is configured to attach to a vehicle outboard fender panel. The main portion is configured to attach to a liner within a vehicle wheel housing structure.

20 Claims, 7 Drawing Sheets

WHEEL HOUSING LINER ASSEMBLY

BACKGROUND

Field of the Invention

The present invention generally relates to vehicle wheel housing liner assembly. More specifically, the present invention relates to vehicle wheel housing liner assembly having a liner supporting bracket that attaches to surfaces of a vehicle wheel housing and supports an upper section of a wheel liner.

Background Information

Modern vehicles typically include wheel wells, also referred to as wheel housing structures, one for each wheel, that cover at least an upper portion of the corresponding one of the wheels. Each wheel housing structure can include a liner that is installed within the wheel housing structure spaced apart from the corresponding one of the wheels. The liners serve several purposes, such as, for example, protecting the wheel housing structure from moisture and possible scaring or denting by debris flying up from wheels as they rotate and reducing road noises. The liners can be made of various in expensive materials, such as recycled plastic, plastics, polymers, or other suitable materials.

SUMMARY

One object of the present disclosure is to provide a liner within a wheel housing structure with a supporting bracket that attaches to and supports a upper section of the liner above and/or adjacent to the wheel within the wheel housing structure.

In view of the state of the known technology, one aspect of the present disclosure is to provide a wheel housing liner assembly with a liner supporting bracket. The liner supporting bracket has a first portion, a second portion and a main portion that extends from the first portion to the second portion. The first portion is configured to attach to an inboard panel of a vehicle wheel housing structure. The second portion is configured to attach to a vehicle outboard fender panel. The main portion is configured to attach to a liner within a vehicle wheel housing structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
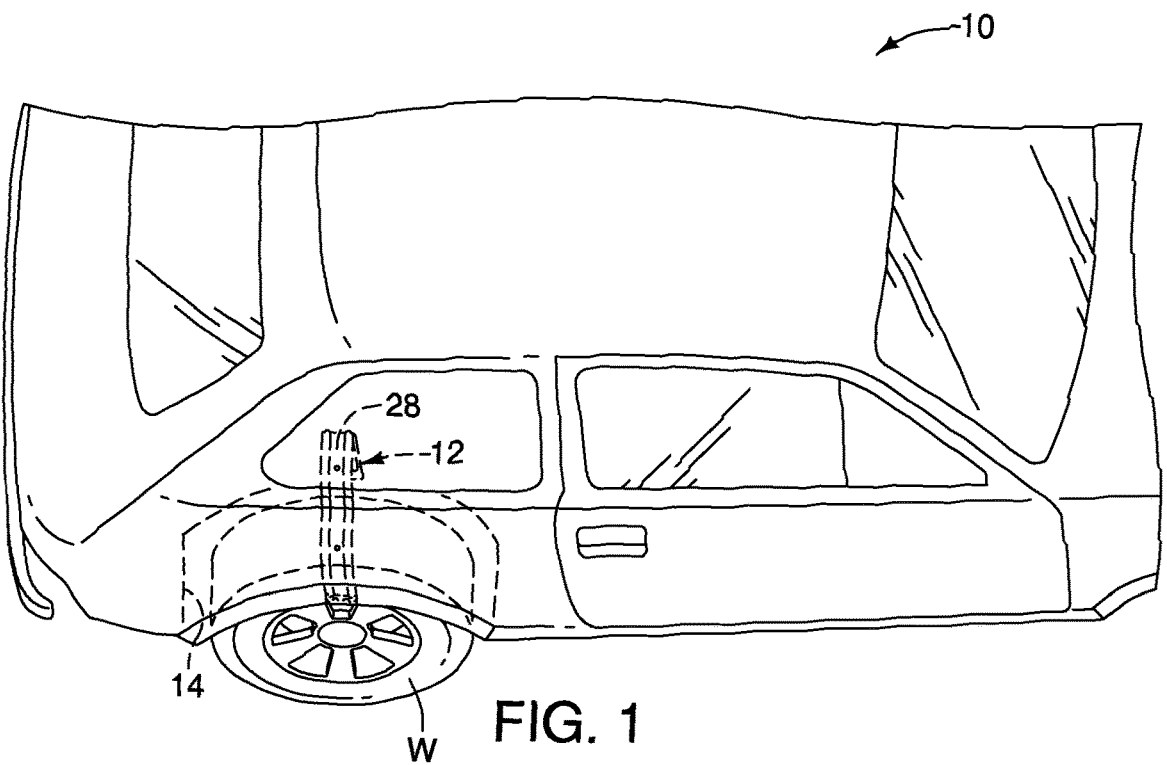
FIG. 1 is a perspective view of a vehicle showing one of a plurality of wheel housing structures that receives a wheel, with a liner assembly installed within the wheel housing structure in accordance with a first embodiment.
Figure 2:
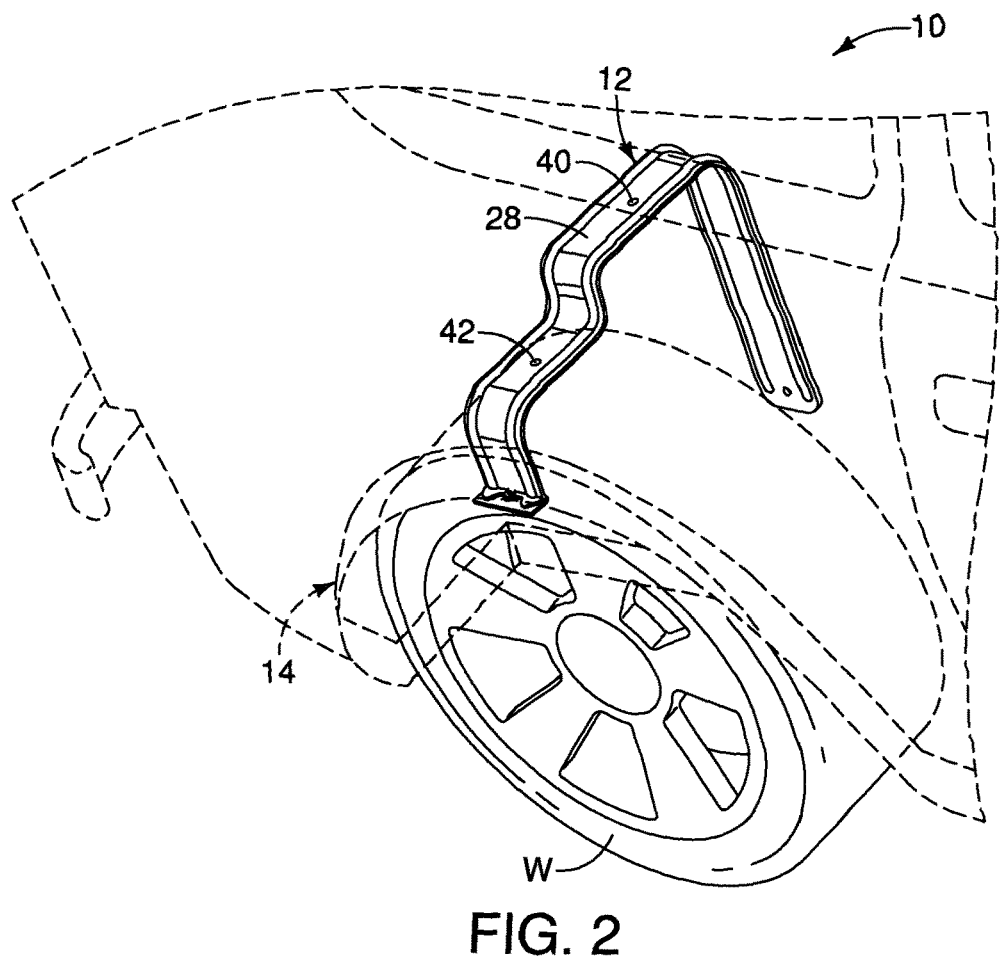
FIG. 2 is another perspective view of the vehicle, the wheel housing structure and the wheel looking in an inboard direction showing a bracket of the liner assembly installed within the wheel housing structure in accordance with the first embodiment.

Referring initially to FIG. 1, a vehicle 10 having a wheel housing liner assembly 12 is illustrated in accordance with a first embodiment.

As shown in FIGS. 1-4, the vehicle 10 has a wheel well, also referred to as a wheel housing structure 14 that is shaped to receive a wheel W of the vehicle 10. The wheel housing structure 14 is shaped and dimensioned such that approximately an upper half of the wheel W is disposed within the wheel housing structure 14 with sufficient space forward, rearward and above the wheel W. The overall shape, dimensions and contours of the wheel housing structure 14 differs from vehicle to vehicle depending on the type of vehicle (coupe, sedan, SUV, crossover, van, pickup truck or large truck). Regardless of the design of the vehicle 10, it is preferred that as the vehicle 10 is driven, the wheel W has plenty of space within the wheel housing structure 14 to move up and down in response to vertical movement resulting from contacting differing road surface conditions. For example, suspension structures (not shown) of the vehicle 10 are designed such that if the wheel W goes over a bump, the suspension structures absorb a portion of the forces associated with contact with the bump and allow the wheel W to move upward, and, thereafter return to its original location. Hence, the wheel housing structure 14 preferably provides sufficient space above, forward and rearward of the wheel W such that the wheel W can move in accordance with the overall design of the suspension structure of the vehicle 10 without contacting any of the surfaces of the wheel housing structure 14 or the wheel housing liner assembly 12, (hereinafter referred to as the liner assembly 12). Since vehicle suspension structures and their responses to various road conditions are conventional vehicle structures and characteristics, further description is omitted for the sake of brevity.

Figure 3:
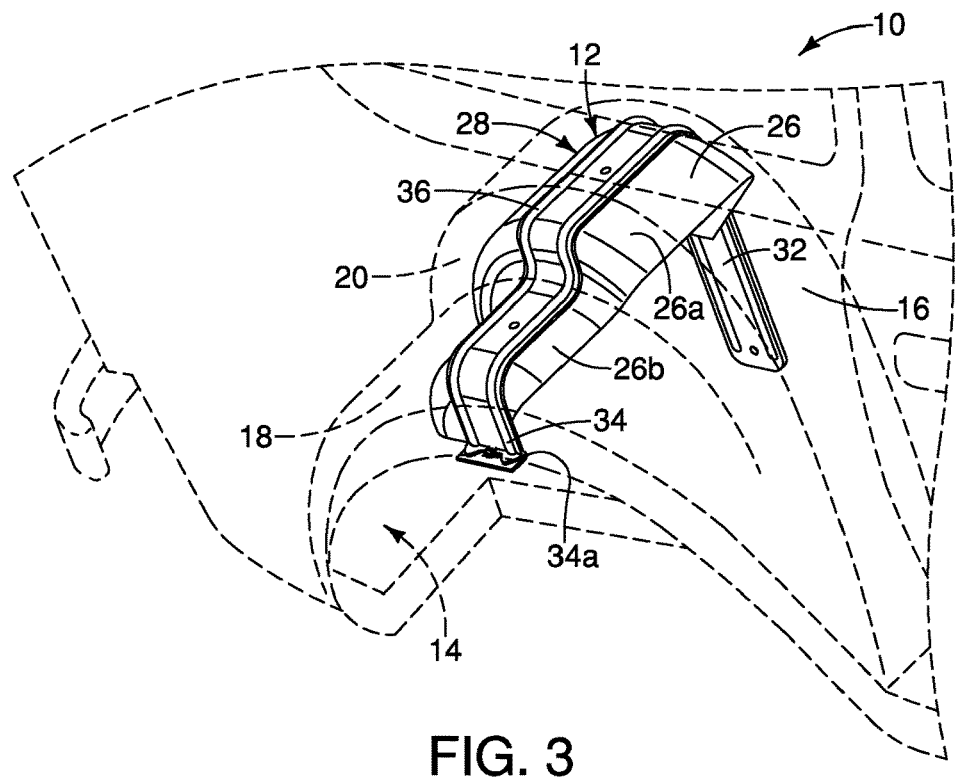
FIG. 3 is another perspective view of the vehicle similar to FIG. 2 with the wheel removed showing the bracket and a portion of a liner of the liner assembly, the bracket supporting an upper section of the liner in accordance with the first embodiment.
Figure 4:
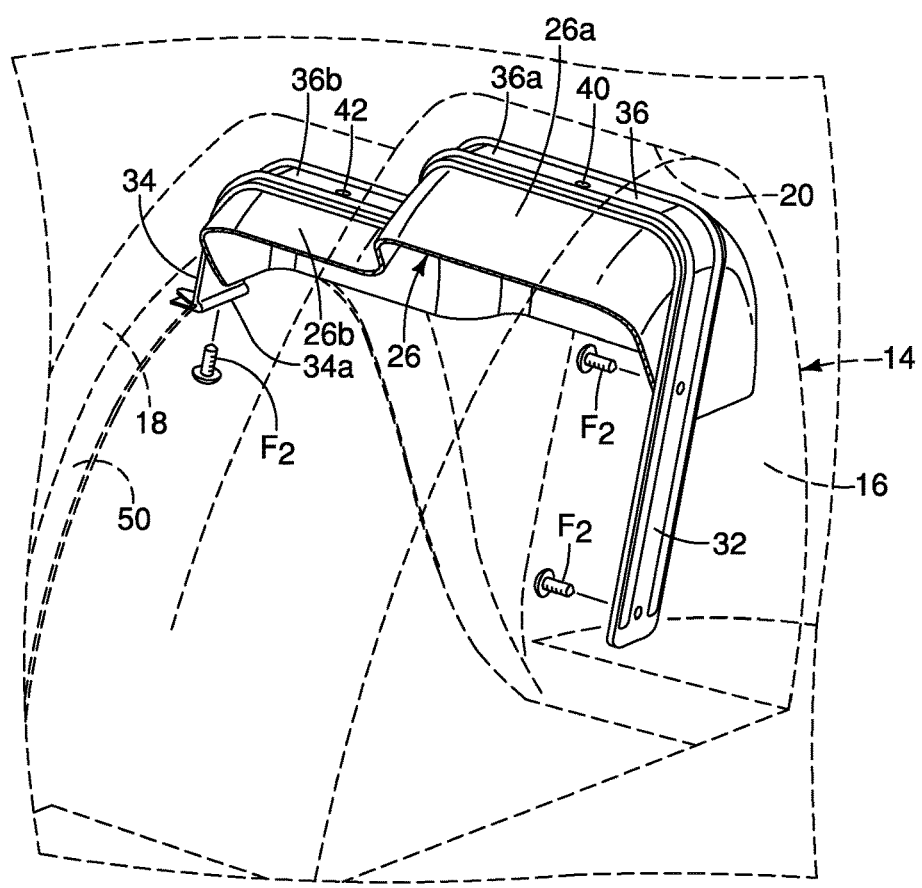
FIG. 4 is another perspective view of the vehicle looking in an outboard direction showing the bracket and a portion of the liner of the liner assembly supporting the upper section of the liner and further showing fasteners that attach the bracket to the wheel housing structure in accordance with the first embodiment.

As shown in phantom in FIGS. 3 and 4, the wheel housing structure 14 (also referred to as a vehicle wheel well or a vehicle wheel housing structure) has an inboard panel 16, an outboard panel 18 and an upper panel 20 that extends from an upper end of the inboard panel 16 to an upper end of the outboard panel 18. The inboard panel 16, the outboard panel 18 and the upper panel 20 can be constructed from different metallic panels, they can alternatively be made of a single sheet of material, such a fiberglass or composite materials, formed with the desired dimensions and shape. Since wheel wells or wheel housing structures are conventional vehicle structures, further description is omitted for the sake of brevity.

As shown in FIGS. 1-4, the liner assembly 12 includes a liner 26 and a liner supporting bracket 28. The liner 26 is a molded member that has a half barrel, or a partial cylindric shape that is positioned beneath the upper panel 20 of the wheel housing structure 14 covering exposed surfaces of the inboard panel 16, the outboard panel 18 and the upper panel 20. The curved shape of the liner 26 allows it to extend from a rearward area of the wheel housing structure 14, upward over the wheel W and curve downward to an area forward of the wheel W. The liner 26 basically shields most if not all of the surfaces that define the wheel housing structure 14 from moisture and debris that can fly off of the wheel W as the wheel W rotates contacting and picking up debris from road surfaces (not shown).

In other words, the liner 26 is dimensioned and shaped to cover and protect exposed surfaces of the inboard panel 16, the outboard panel 18 and the upper panel 20 within the wheel housing structure 14, as well as mechanical structures installed within the wheel housing structure 14 above the liner 26. For example, depending upon the overall design of the vehicle, the wheel housing structure 14 can include a wiring harness (not shown), vacuum lines (not shown) or a fuel filler tube (not shown) all located above the liner 26. When installed within the wheel housing structure 14, the liner 26 can cover, protect and conceal such vehicle components and features.

The liner 26 is typically made of a plastic, polymer, recycled materials or hardened resin material such that the wheel housing line 26 is inexpensive to manufacture and is light weight. The liner 26 is dimensioned and shaped to fit within the wheel housing structure 14 completely covering the exposed surfaces of the wheel housing structure 14 in a conventional manner. The liner 26 can be molded to overlay all surfaces of the wheel housing structure 14, or can be shaped and dimensioned such that there is sufficient space above the liner 26 for the above mentioned vehicle components and features concealed by the liner 26. For the sake of clarity, only an upper portion 26a of the liner 26 is shown in the drawings. It should be understood from the drawings and the description herein that the liner 26 is much larger than is shown in the drawings. The liner 26 is attach to the wheel housing structure 14 by mechanical fasteners $F_1$ in a conventional manner. Since wheel housing structure liners are conventional vehicle elements, further description is omitted for the sake of brevity.

A description is now provided for the liner supporting bracket 28 (hereinafter the bracket 28) with specific reference to FIGS. 2-7. The bracket 28 has a first portion 32, a second portion 34 and a main portion 36 that extends from the first portion 32 to the second portion 34. The first portion 32 and the second portion 34 are upright or vertically oriented when installed to the wheel housing structure 14. Further, the first portion 32 and the second portion 34 are approximately parallel, but can be non-parallel, depending upon the design of the wheel housing structure 14 of the vehicle 10. For example, if the inboard panel 16 and outboard panel 18 of the wheel housing structure 14 are parallel to one another, then the first portion 32 and the second portion 34 are approximately parallel to one another too. Further, if the inboard panel 16 and outboard panel 18 of the wheel housing structure 14 are not parallel to one another, then the first portion 32 and the second portion 34 is dimensioned and shaped to fit between the inboard panel 16 and outboard panel 18 and will not necessarily be parallel to one another.

Figure 6:
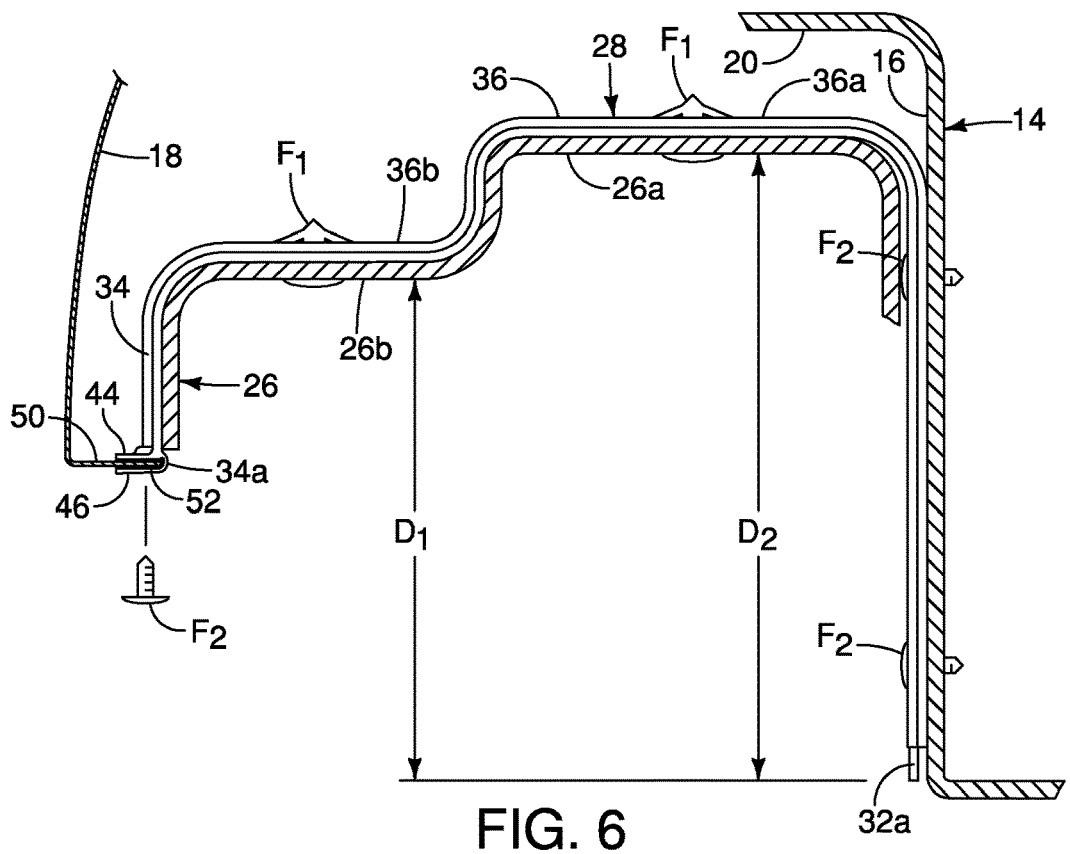
FIG. 6 is a front view of the bracket of the liner assembly attached to an outboard portion of the wheel housing structure via the fastener in accordance with the first embodiment.
Figure 7:
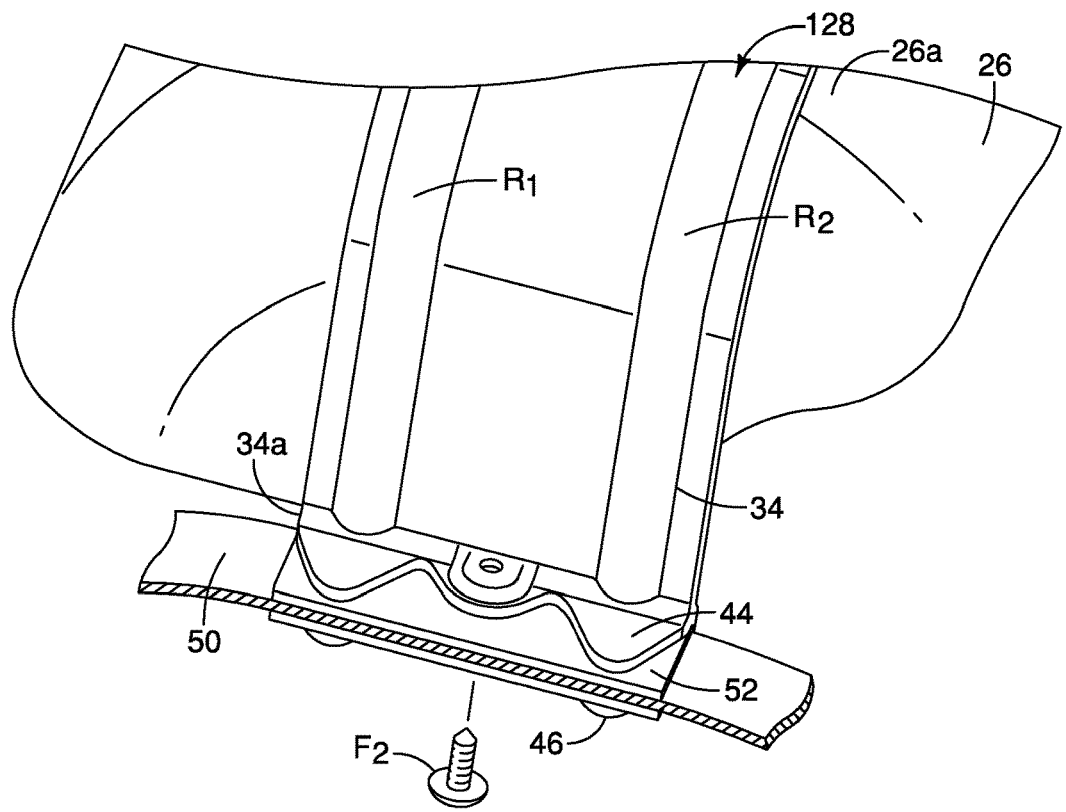
FIG. 7 is a perspective view of the bracket, the liner and the outboard portion of the wheel housing structure in accordance with the first embodiment.

The first portion 32 is configured to attached to the inboard panel 16 of the wheel housing structure 14 via mechanical fasteners $F_2$, as shown in FIGS. 4 and 6. The second portion 34 is attached to the outboard panel 18 of the wheel housing structure 14 in a manner described in greater detail below. The main portion 36 includes one or more openings that receive fasteners $F_1$ in order to attach to the upper portion 26a of the liner 26, as shown in FIG. 6.

The bracket 28 is formed with a pair of stiffening ribs $R_1$ and $R_2$ that extend along the first portion 32, the second portion 34 and the main portion 36. The main portion 36 is an upper most section of the bracket 28, once installed to the wheel housing structure 14. The main portion 36 includes a first straight portion 36a and a second straight portion 36b. The first straight portion 36a extends from the first portion 32 to the second straight portion 36b. The second straight portion 36b extends to the second portion 32. As shown in FIG. 4, the first straight portion 36a has at least one attachment location 40 (an opening 40) for attachment to the upper portion 26a of the liner 26. Further, the second straight portion 36b has at least one attachment location 42 (an opening 42) for attachment to a second portion 26b of the liner 26.

As shown in FIG. 6, the second straight portion 36b is located a first distance $D_1$ above a lower or distal end 32a of the first portion 32. The first straight portion 36a is located a second distance $D_2$ above the distal end 32a of the first portion 32. The second distance $D_2$ is greater than the first distance $D_1$. The lowered position of the second straight portion 36b (lower than the first straight portion 36a) can be configured to make space for the above mentioned vehicle components and features, or can be provided due to the overall shapes and contours of the wheel housing structure 14.

Figure 5:
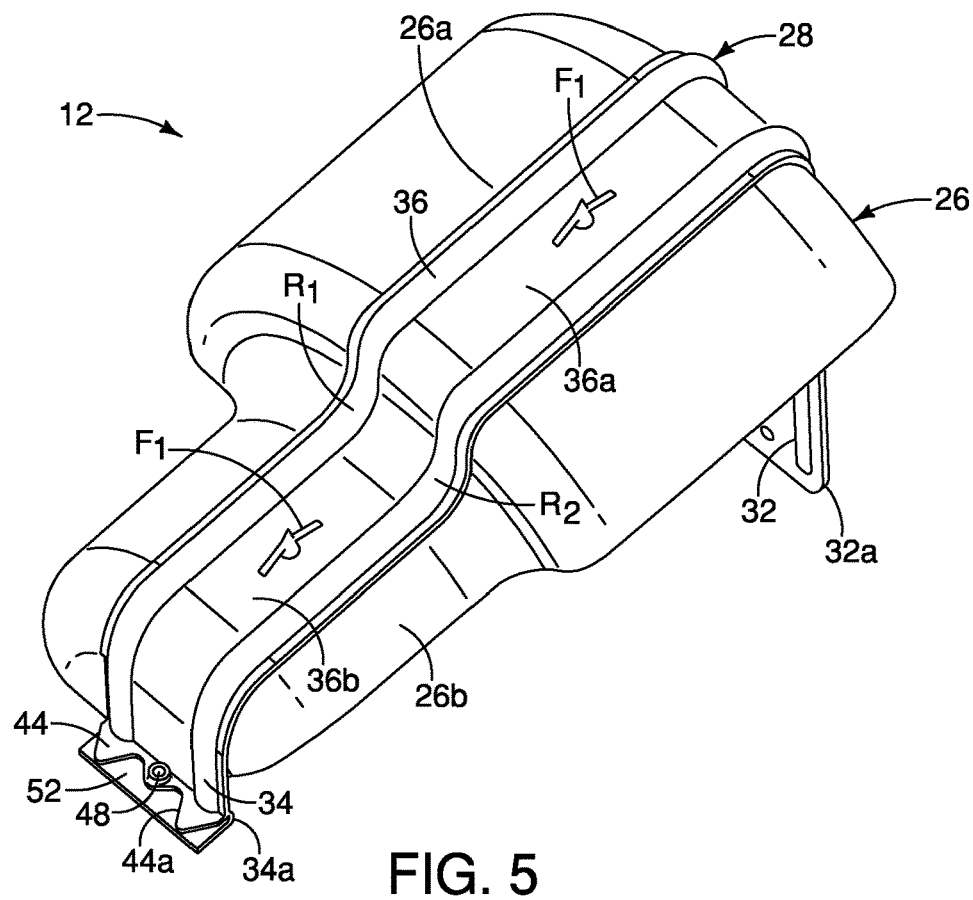
FIG. 5 is a top perspective view of the liner assembly removed from the vehicle showing the attachment between the bracket and the liner in accordance with the first embodiment.

As shown in FIGS. 5 and 6, a lower end 34a of the second portion 34 includes an upper flange 44 and a lower flange 46 that are horizontally oriented with the bracket 28 installed to the vehicle 10. A fastener receiving opening 48 is defined within each of the upper and lower flanges 44 and 46. As is also shown in FIG. 6, the material that defines the outboard panel 18 of the wheel housing structure 14 includes an inboard extending flange 50. When installed, the lower end 34a of the second portion 34 of the bracket 28 is moved toward the inboard extending flange 50 such that the inboard extending flange 50 is captured between the upper flange 44 and the lower flange 46. A resilient liner 52 wraps around the inboard extending flange 50 to prevent noise and provide a cushioning effect. The resilient liner 52 is also captured between the upper flange 44 and the lower flange 46. With the inboard extending flange 50 inserted between the upper flange 44 and the lower flange 46, another one of the fasteners $F_2$ is threaded into the openings 48 in the upper flange 44 and the lower flange 46, and is further threaded into a corresponding opening in the flange 50 (not shown), thereby fixing the second portion 34 to the flange 50 and the outboard panel 18.

Alternatively, with predetermined dimensions and spacing between the upper flange 44 and the lower flange 46, the inboard extending flange 50 can be forced between the upper flange 44 and the lower flange 46. When forced therebetween, the inboard extending flange 50 is clamped between the upper flange 44 and the lower flange 46 with biasing resilience of the upper flange 44 and the lower flange 46 providing clamping force such that the fastener $F_2$ is not required.

At least the upper flange 44 has contoured outboard edge 44a, as shown in FIG. 5. Specifically, the contoured outboard edge 44a has a sinusoidal or claw-like shape. The lower flange 46 can be similarly shaped with a contoured outboard edge parallel to the first flange 44.

With the bracket 28 installed within the wheel housing structure 14, the liner 26 can be installed to one or both of the first straight portion 36a and the second straight portion 36b via the fasteners $F_1$, from below the main portion 36 of the bracket 28, as shown in FIGS. 5 and 6. Hence, the bracket 28 can be covered and concealed by the liner 26. More specifically, one of the fasteners $F_1$ is inserted through an opening (not shown) in the upper portion 26a of the liner 26 and into the opening 40, and another of the fasteners $F_1$ is inserted through another opening (not shown) in the second portion 26b of the liner 26 and into the opening 42. The fasteners $F_1$ can be any of a variety of conventional fasteners, such as threaded mechanical fasteners, rivets or snap-fitting mechanical fasteners.

Alternatively, the bracket 28 can be installed beneath the liner 26 such that the bracket 28 is exposed after installation.

One of the advantages of the inclusion of the bracket 28, is that the upper portion 26a of the liner 26 is provided with added support. Since the liner 26 is made of material such as plastic or polymer material, over time the liner 26 can lose some of its inherent rigidity and resilience over time. For example, if the vehicle 10 is a heavy-duty truck that is used in off-road conditions or construction sites where pebbles, small stones, and other debris routinely impacts portions of the liner 26. Further repeated exposure to hot and cold weather conditions can also influence the characteristics of the liner 26. Over a period of time in rough environmental conditions, the upper portion 26a of the liner 26 might sag and contact the wheel W in the absence of the bracket 28. The inclusion of the bracket 28 prevents or at the very least minimizes the possibility of sagging of the upper portion 26a of the liner 26.

Second Embodiment

Figure 8:
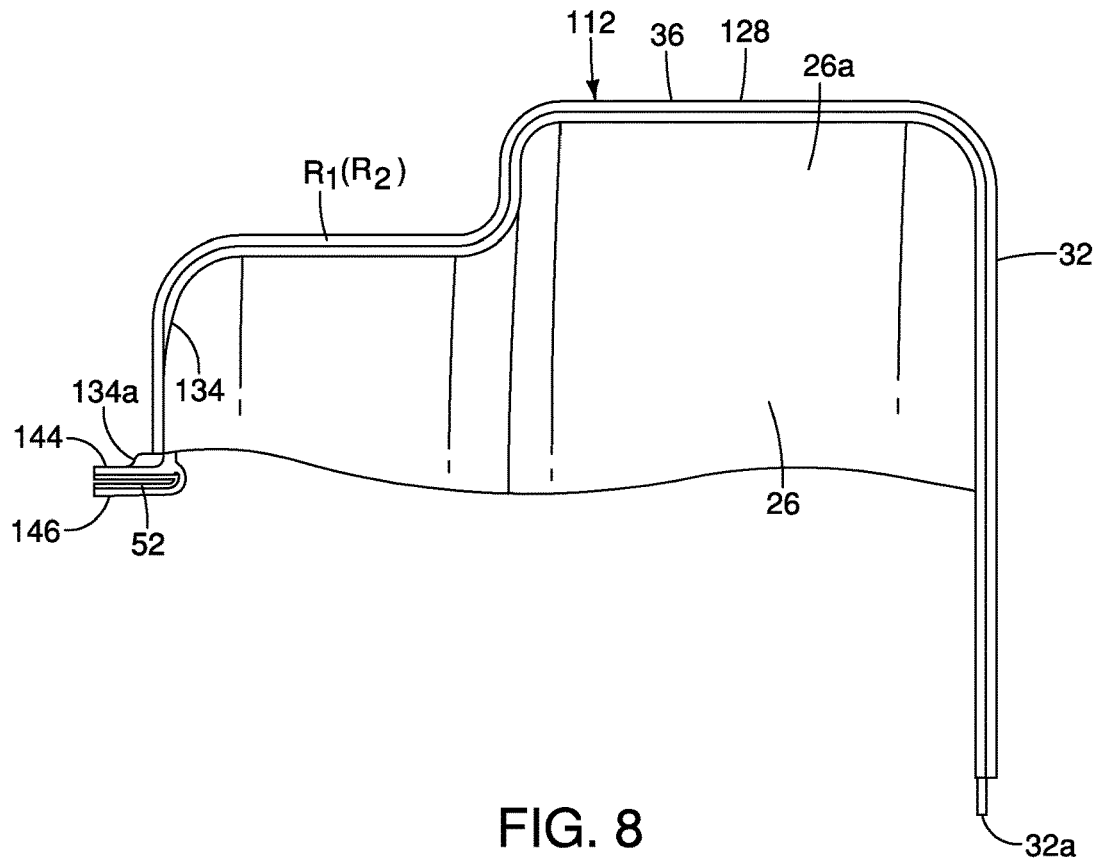
FIG. 8 is a front view of a bracket of a wheel housing liner assembly that includes a force-fitting outboard end in accordance with a second embodiment.
Figure 9:
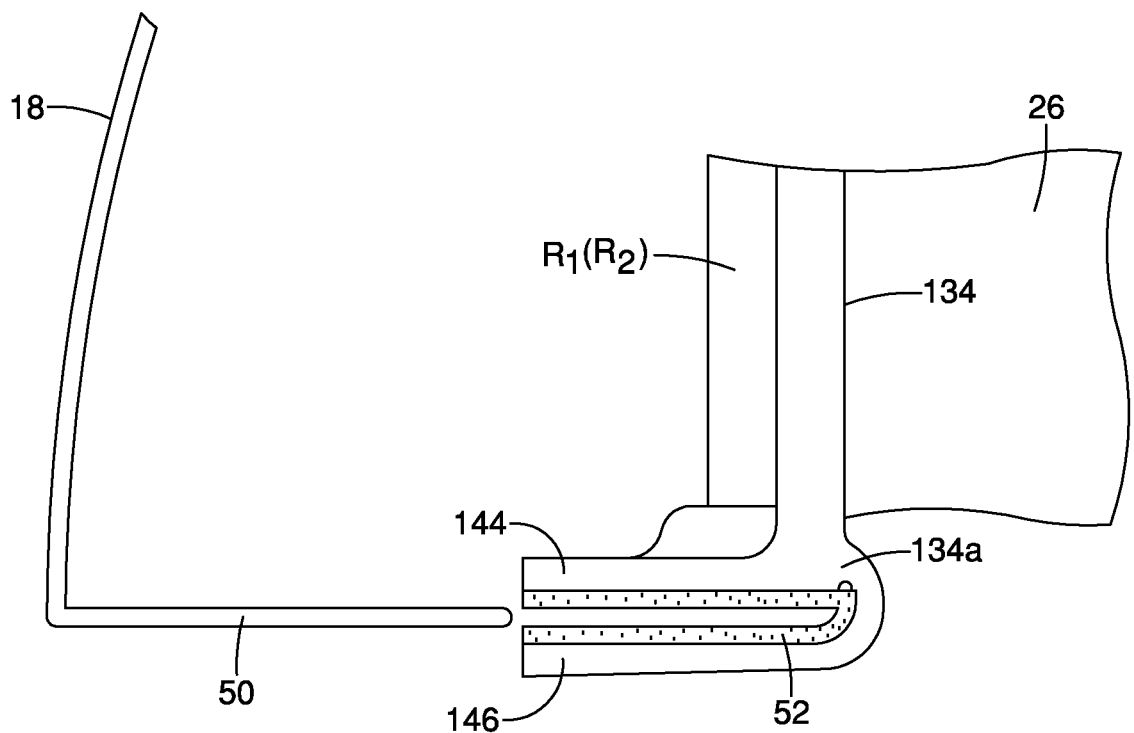
FIG. 9 is another front view of the force-fitting end of the bracket aligned with a flange of an outboard panel (a fender panel) that defines an outboard panel of a wheel housing structure in accordance with the second embodiment.
Figure 10:
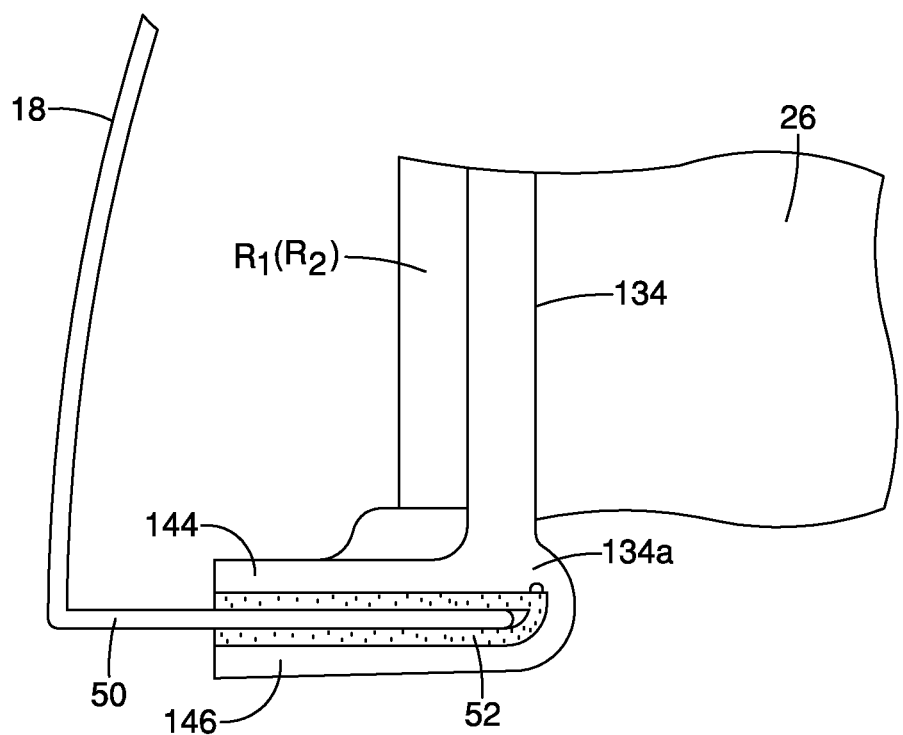
FIG. 10 is another front view of the bracket showing the force-fitting end clamped to the flange of the outboard panel in accordance with the second embodiment.

Referring now to FIG. 8-10, a wheel housing liner assembly 112 having a liner supporting bracket 128 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the liner 26 is supported by liner support bracket 128 in a manner that is similar to the use of the liner 28 of the first embodiment. However, in the second embodiment, the liner support bracket 128 (hereinafter the bracket 128) has been modified as compared to the bracket 28 of the first embodiment.

The bracket 128 includes the first end portion 32 and the main portion 36, as described above in the first embodiment. However, in the second embodiment, a second end portion 134 of the bracket 128 replaces the second end portion 34 of the first embodiment.

The second end portion 134 has a lower end 134a that includes an upper flange 144 and a lower flange 146 that are dimensioned and configured such that when force fitted to the flange 50 of the outer panel 18 of the wheel housing structure 14, the upper flange 144 and the lower flange 146 clamp to the flange 50 (with the resilient liner 52 fitted between the upper flange 144 and the lower flange 146. The upper flange 144 and the lower flange 146 can have any of a variety of shapes and are depicted with an overall rectangular shape, as viewed from above (see FIG. 11 of the third embodiment).

Specifically, as shown in FIG. 9, a gap between the upper flange 144 and the lower flange 146 of the lower end 134a is aligned with the flange 50. The resilient liner 52 is disposed between the upper flange 144 and the lower flange 146, or alternatively, can be fitted to the flange 50. The lower end 134a is then pushed or forced into contact with the flange 50. The upper flange 144 and the lower flange 146 move away from one another when receiving the flange 50. The upper flange 144 and the lower flange 146 are formed with a bias to return to their original orientations, there by providing a biasing force that clamps to the flange 50, as shown in FIG. 10.

Third Embodiment

Figure 11:
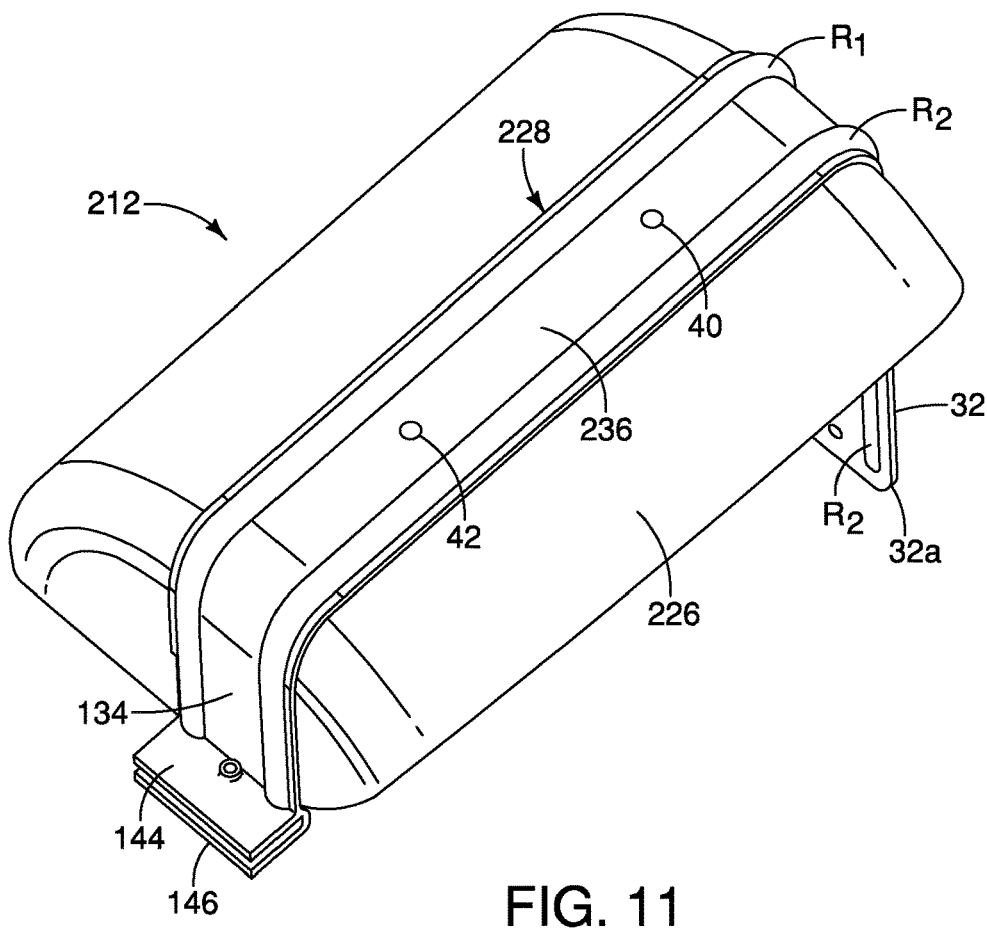
FIG. 11 is a perspective view of a bracket and liner in accordance with a third embodiment.
Figure 12:
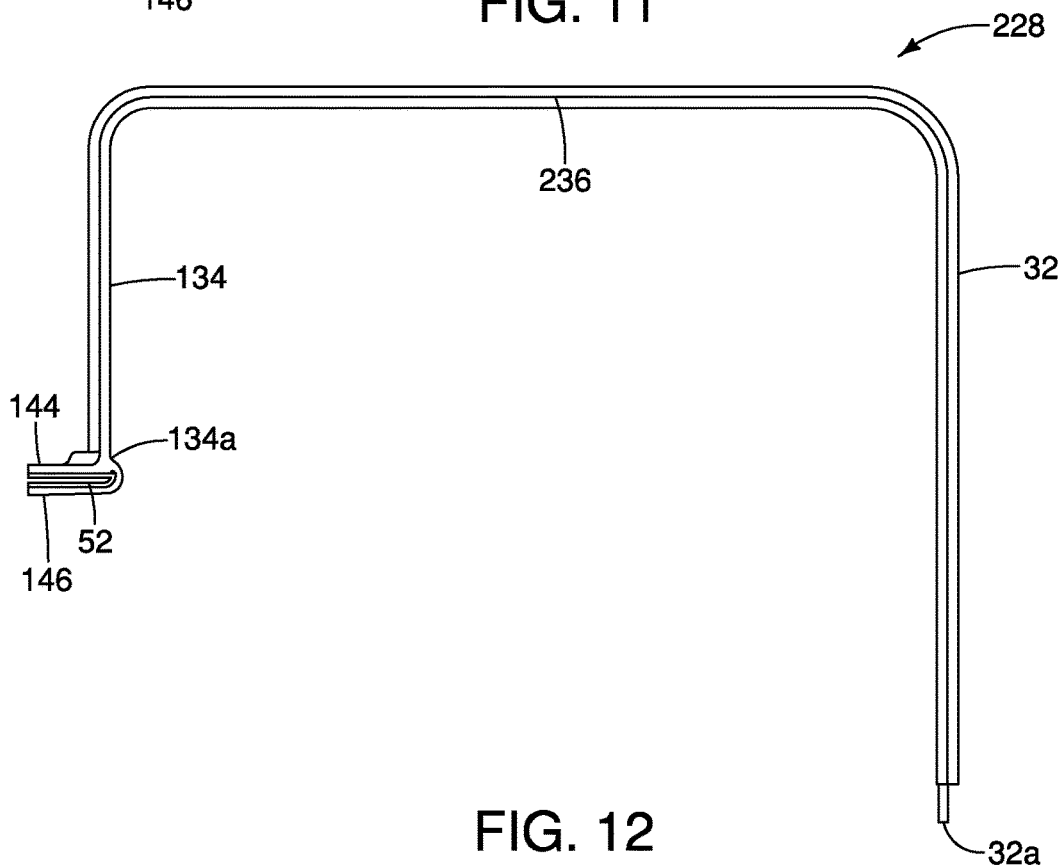
FIG. 12 is a front view of the bracket and liner in accordance with the third embodiment.

Referring now to FIGS. 11 and 12, a wheel housing liner assembly 212 in accordance with a third embodiment will now be explained. In view of the similarity between the first, second and third embodiments, the parts of the third embodiment that are identical to the parts of the first or second embodiment will be given the same reference numerals as the parts of the first embodiment. Moreover, the descriptions of the parts of the third embodiment that are identical to the parts of the first embodiment or the second embodiment may be omitted for the sake of brevity.

In the third embodiment the wheel housing liner assembly 212 includes a bracket 228 that includes the first end portion 32, as described above with respect to the first embodiment, the second end portion 134, as described above with respect to the second embodiment, and, a main portion 236.

The main portion 236 is straight. In other words, the main portion 236 does not include the first and second straight portions 36a and 36b of the first embodiment. Rather, the main portion 236 generally has a uniform straight profile extending between the first end portion 32 and the second end portion 134. Preferably, the main portion 236 is perpendicular to the first portion 32.

Similarly, a liner 226 has a top end that conforms to the straight shape of the main portion 236.

Fourth Embodiment

Figure 13:
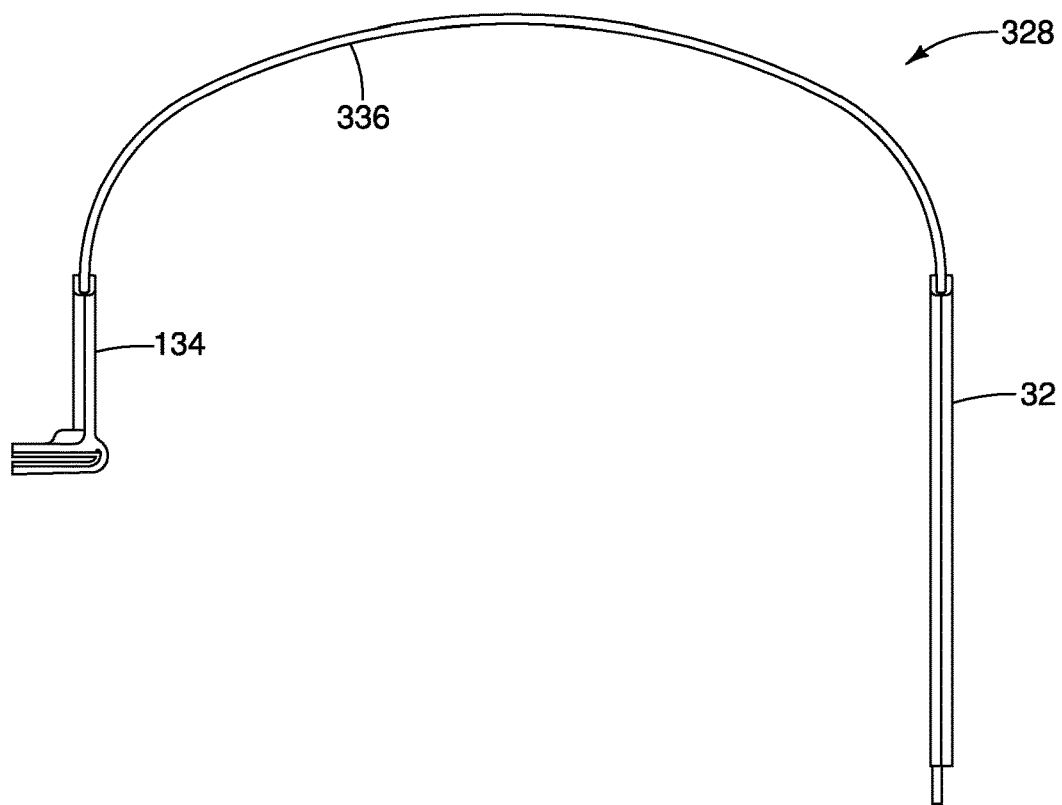
FIG. 13 is a front view of a bracket in accordance with a fourth embodiment.

Referring now to FIG. 13, a wheel housing liner assembly 312 in accordance with a fourth embodiment will now be explained. In view of the similarity between the first, second and fourth embodiments, the parts of the fourth embodiment that are identical to the parts of the first and second embodiments will be given the same reference numerals as the parts of the first embodiment. Moreover, the descriptions of the parts of the fourth embodiment that are identical to the parts of the first and second embodiments may be omitted for the sake of brevity.

In the fourth embodiment the wheel housing liner assembly 312 includes a bracket 328 that includes the first end portion 32, as described above with respect to the first embodiment, the second end portion 134, as described above with respect to the second embodiment, and, a main portion 336. In the fourth embodiment, the main portion 336 has an overall curved shape extending from the second portion 134 to the first portion 32.

Although not shown, a liner has a corresponding upper end that conforms to the curved shape of the main portion 336.

Fifth Embodiment

Figure 14:
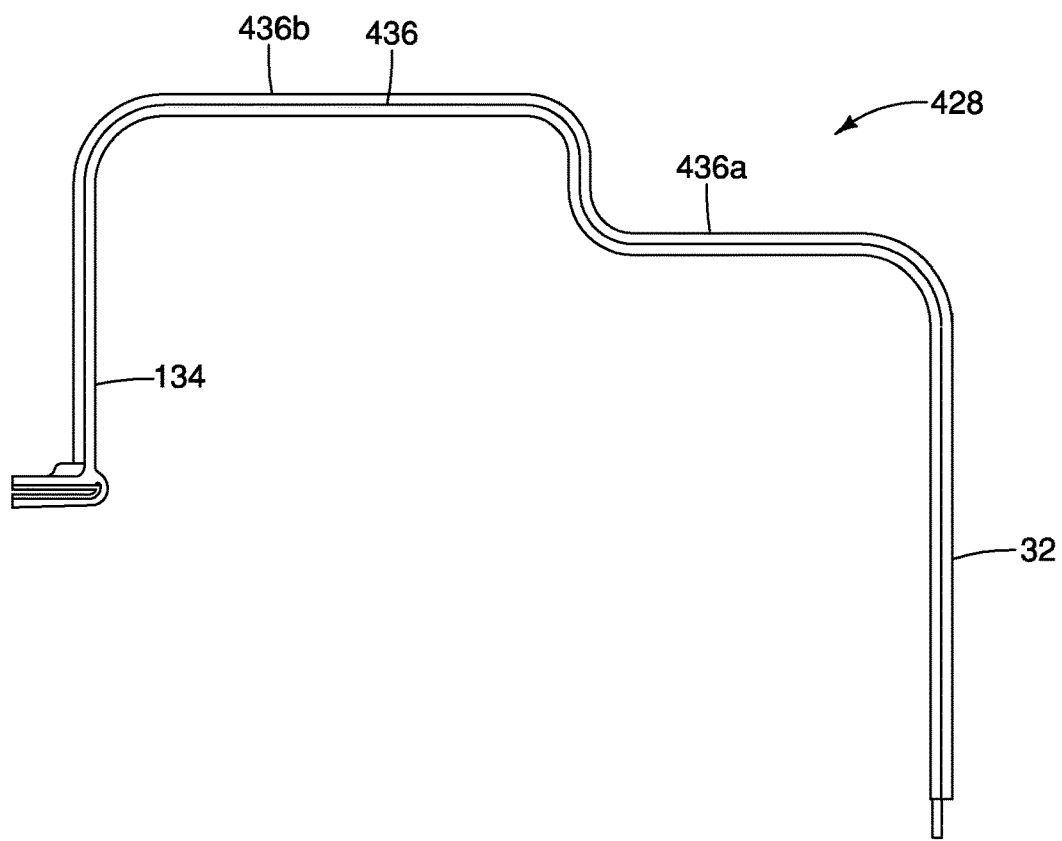
FIG. 14 is a front view of a bracket in accordance with a fifth embodiment.

Referring now to FIG. 14, a wheel housing liner assembly 412 in accordance with a fifth embodiment will now be explained. In view of the similarity between the first, second and fifth embodiments, the parts of the fifth embodiment that are identical to the parts of the first and second embodiments will be given the same reference numerals as the parts of the first embodiment. Moreover, the descriptions of the parts of the fifth embodiment that are identical to the parts of the first and second embodiments may be omitted for the sake of brevity.

In the fifth embodiment the wheel housing liner assembly 412 includes a bracket 428 that includes the first end portion 32, as described above with respect to the first embodiment, the second end portion 134, as described above with respect to the second embodiment, and, a main portion 436.

The main portion 436 includes a first straight portion 436a and a second straight portion 436b. In the fifth embodiment, the distances of the first straight portion 436a and the second straight portion 436b are reversed, as compared to the first straight portion 36a and the second straight portion 36b of the first embodiment.

Similarly, a liner (not shown) has a top end that conforms to the shapes of the first straight portion 436a and the second straight portion 436b of the main portion 436.

The vehicle structures, elements and components shown in the drawings, other than the features of the wheel housing liner assembly 12, are conventional components that are well known in the art. Since these vehicle structures, elements and components are well known in the art, these structures, features and components will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the wheel housing liner assembly. Accordingly, these terms, as utilized to describe the present invention should be interpreted relative to a vehicle equipped with the wheel housing liner assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A wheel housing liner assembly, comprising:
 a liner supporting bracket having a first portion, a second portion and a main portion that extends from the first portion to the second portion, the first portion being configured to attach to an inboard panel of a vehicle wheel housing structure, the second portion being configured to attach to a vehicle outboard fender panel, and the main portion being configured to attach to a liner within a vehicle wheel housing structure.

2. The wheel housing liner assembly according to claim 1, wherein
 the main portion includes a first straight portion that extends from the first portion toward the second portion, the first straight portion having at least one attachment location for attachment to an upper surface of the liner.

3. The wheel housing liner assembly according to claim 2, wherein
 the main portion includes a second straight portion that extends from the first straight portion to the first portion, the second straight portion located a first distance above a distal end of the first portion, the first straight portion located a second distance above a distal end of the first portion, the second distance being greater than the first distance.

4. The wheel housing liner assembly according to claim 1, wherein
the main portion has an overall curved shape extending from the second portion to the first portion.

5. The wheel housing liner assembly according to claim 1, wherein
the main portion has an overall straight shape that extends from the second portion to the first portion, the main portion being perpendicular to the first portion.

6. The wheel housing liner assembly according to claim 1, wherein
a distal end of the second portion includes at least one attachment flange configured to attach to an inboard extending flange of the vehicle wheel housing structure.

7. The wheel housing liner assembly according to claim 6, wherein
the at least one attachment flange of the distal end of the second portion attaches to the flange of the vehicle wheel housing structure via a mechanical fastener.

8. The wheel housing liner assembly according to claim 1, wherein
a distal end of the second portion includes a pair of flanges configured to clamp to an inboard extending flange of the vehicle wheel housing structure.

9. The wheel housing liner assembly according to claim 8, wherein
the pair of flanges of the second portion include a first rectangular flange and a second rectangular flange parallel to one another.

10. The wheel housing liner assembly according to claim 8, wherein
the pair of flanges of the second portion include a first flange having a contoured outboard edge and a second flange having a contoured outboard edge parallel to the first flange.

11. The wheel housing liner assembly according to claim 1, wherein
the first portion attaches to the inboard panel of a vehicle wheel housing structure via mechanical fasteners.

12. The wheel housing liner assembly according to claim 1, wherein
the liner supporting bracket is formed with a pair of stiffening ribs that extend along the first portion, the second portion and the main portion.

13. A wheel housing liner assembly, comprising:
a vehicle wheel housing structure having an inboard panel, an outboard panel and an upper surface extending from the inboard panel to the outboard panel;
a liner dimensioned and shaped to cover the inboard panel, the outboard panel and the upper surface of the wheel housing structure and attach thereto; and
a liner supporting bracket having a first portion, a second portion and a main portion that extends from the first portion to the second portion, the first portion being attached to the inboard panel of the wheel housing structure, the second portion being attached to the outboard panel, and the main portion being attached to the liner.

14. The wheel housing liner assembly according to claim 13, wherein
the main portion includes a first straight portion and a second straight portion, the first straight portion extending from the first portion to the second straight portion, the first straight portion having at least one attachment location for attachment to an upper surface of the liner, the second straight portion extending from the first straight portion to the first portion, the second straight portion located a first distance above a distal end of the first portion, the first straight portion located a second distance above a distal end of the first portion, the second distance being greater than the first distance.

15. The wheel housing liner assembly according to claim 13, wherein
the main portion has an overall curved shape extending from the second portion to the first portion.

16. The wheel housing liner assembly according to claim 13, wherein
the main portion has an overall straight shape that extends from the second portion to the first portion, the main portion being perpendicular to the first portion.

17. The wheel housing liner assembly according to claim 13, wherein
a distal end of the second portion includes at least one attachment flange attached to an inboard extending flange of the vehicle wheel housing structure via a mechanical fastener.

18. The wheel housing liner assembly according to claim 13, wherein
a distal end of the second portion includes a pair of flanges clamped to an inboard extending flange of the vehicle wheel housing structure, the pair of flanges of the second portion including a first rectangular flange and a second rectangular flange parallel to one another.

19. The wheel housing liner assembly according to claim 13, wherein
a distal end of the second portion includes a pair of flanges clamped to an inboard extending flange of the vehicle wheel housing structure, the pair of flanges of the second portion including a first flange having a contoured outboard edge and a second flange having a contoured outboard edge parallel to the first flange.

20. The wheel housing liner assembly according to claim 13, wherein
the liner supporting bracket is formed with a pair of stiffening ribs that extend along the first portion, the second portion and the main portion.

* * * * *